Patented July 19, 1949

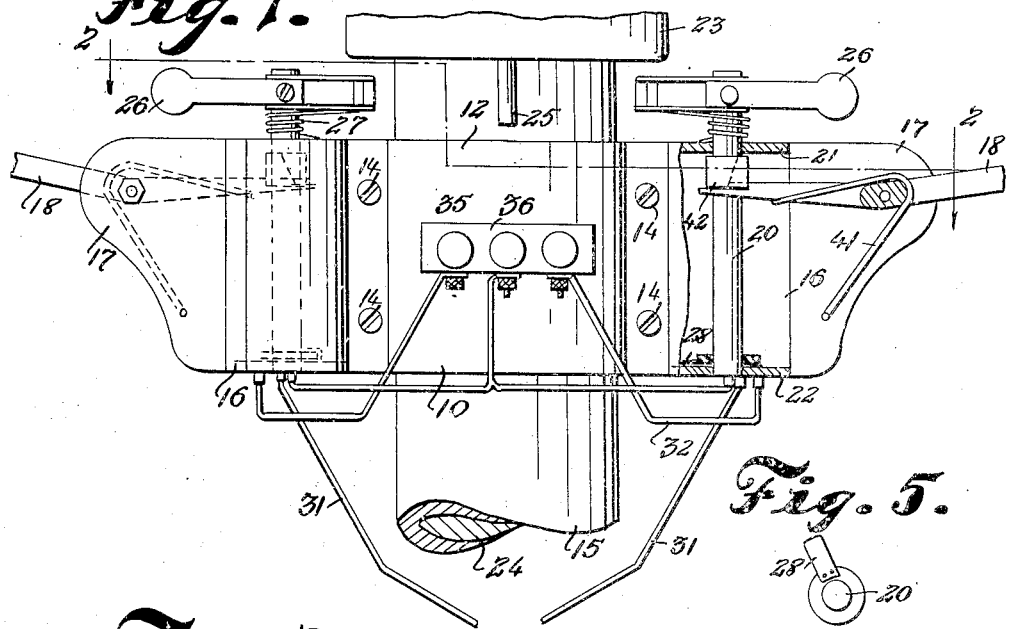
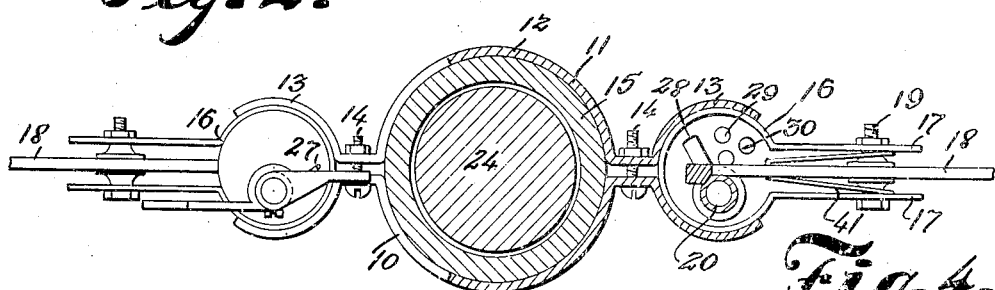
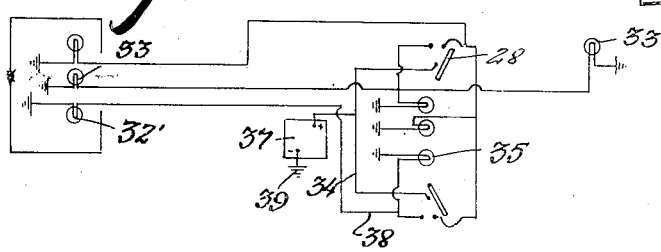

2,476,487

UNITED STATES PATENT OFFICE 2,476,487

VEHICLE SIGNAL LIGHT SWITCH

Harlow G. Frank, Compton, Calif.

Application July 19, 1946, Serial No. 684,838

1 Claim. (Cl. 200—59)

The invention relates to a signalling system for a motor vehicle and more especially to an electric direction indicator switch for a motor vehicle.

The primary object of the invention is the provision of a system or switch of this character, wherein a plurality of controls are arranged therewith so that independent signals may be issued at determined periods, making visible the course of a vehicle, either for a right hand or left hand turn, slow or fast driving and the bringing of such vehicle to a stop.

Another object of the invention is the provision of a system or switch of this character, wherein it is actuated manually at the steering wheel of a motor or other vehicle within easy reach of the operator at all times, so that visible signals may be given promptly to approaching traffic as to the direction of travel of the vehicle issuing the signals, the system or switch being of novel construction, and is unique in the assembly of its parts, to have it compact and trustworthy of operation.

A further object of the invention is the provision of a system or switch of this character, wherein a wide range signalling operation is assured in the use thereof, and is adaptable for convenient mounting on the steering column of vehicle, to be handy for service with ease and dispatch.

A still further object of the invention is the provision of a system or switch of this character, which is simple in construction, thoroughly reliable and efficient in operation, strong, durable, possessed of few parts, thus economical in repairs and replacements, readily and easily actuated and inexpensive to manufacture and install.

With these and other objects in view the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary elevation of a vehicle steering wheel showing the system or switch, partly broken away, constructed in accordance with the invention.

Figure 2 is a sectional view taken on the line 2—2 of Figure 1 looking in the direction of the arrows.

Figure 3 is a diagrammatic plan view of the system or switch with the signalling appurtenances in association therewith.

Figure 4 is a fragmentary detail elevation of one of the release triggers of the system or signal switch.

Figure 5 is a detail plan view of a contact element.

Similar reference characters indicate corresponding parts throughout the several views in the drawing.

Referring to the drawing in detail, the system or switch constituting the present invention, comprises a two part mounting or hanger bracket, involving companion parts 10 and 11, respectively, which are alike to each other, and together effect a medial collar shaped column clamp 12, and outer cylindrical housing clamps 13 the latter two in number, these parts 10 and 11 being adjustably secured together by fasteners 14 to fixedly embrace a steering wheel column, only a portion of the same being denoted at 15, and this mounting or bracket underlies the steering wheel rim, not shown and comparatively close thereto.

The clamp 12 is the embracing area for the column or post 15, while rigidly held in the clamps 13 are the housings 16, each longitudinally split at its outermost side, where there is provided a pair of spaced upstanding or vertical wings 17 effecting bearings. Between the wings 17 at opposite sides of the column or post 15 are diametrically arranged vertically swingable release lever-like latches or triggers 18, each supported on cross pivots 19, fitted to the wings 17, for the vertical swing of such latch or trigger common thereto. The outer portion of each latch or trigger 18 effects a hand grip, not shown, which is located adjacent to the steering wheel rim, so that the said latch or trigger can be conveniently operated by the hand or finger thereof of the operator of the steering wheel within the vehicle not shown.

Concentrically mounted within each housing 16 held fast within each clamp 13, is a vertically disposed rotatable stem 20 which has bearing fitting in the closed top and bottom insulated heads 21 and 22, respectively, of the housing, and such stem extends upwardly a distance above the top head 21, the column or post head 23 for the steering wheel being rotatable, while the column or post 15 for the wheel is stationary as usual, and the shaft 24 for this head 23 is rotatable for the steering of the vehicle in the ordinary well known manner.

The head 23 at one point of its outer periphery is provided with a striker lug 25 which is adapted for alternate engagement with either of the pair of turning keys 26, which are fixed to the upper ends of the stems 20, the keys 26 being in the path of travel of the lug 25 on reverse turning of the steering wheel in the guiding of the vehicle for a right hand or left hand turn of the latter. The keys 26 are tensioned for resetting thereof to normal position by springs 27 about the stems 20 beneath the said keys.

The stem 20 each has carried thereby arm 28 which is insulated therefrom and is adapted for sweeping engagement with terminal contacts 29 and 30, respectively, located concentrically to the said stem at the inner face of the bottom head 22 of each housing 16 for the independent closing of circuits 31 and 32 respectively, having therein associated signal lamps 32' and 33, the former being aft of the vehicle and the latter, one located aft and one fore of the same, these designed to indicate a slowing down of the speed of such vehicle, while the signal lamps 32 are for indicating either a right-hand turn or a left-hand turn in the vehicle's directional course, in conformity with the turning of the steering wheel.

Included in the circuits 31 and 32 are electrical connections 34 to tell-tale or pilot lamps 35, which are supported in a group arrangement upon a mounting 36 upon the column or post 15 in direct view of the operator of the steering wheel, so on the closing of these circuits 31 and 32 the lamps will be indicative of the fact that the direction indicator lamps 32' and 33 are lighted and working for signalling purposes, the source of electric current supply being had from a storage battery 37 through connections 38 and grounded at 39.

The latches or triggers 18 are tensioned by springs 41 to engage keepers 42 on the stems 20 to normally lock these to hold the switch blades or arms 28 from the contacts 29 and 30, so that the circuits 31 and 32 are open and the lamps 32' and 33 unlighted.

To operate the lights for either turn the same is true as for a right turn which will hereinafter be described. By exerting a light upward pressure on the outer end of the right hand lever 18, the inner end of the lever is lowered to disengage this end from its respective keeper 42, the normal inoperative position of these elements as shown in Fig. 1.

As the hand lever 18 is disengaged the spring 27 on the key 26 will cause the shaft 20 to rotate backward toward the driver, this rotation continues until the keeper engages the lever again as shown in Fig. 4, at this time the arm 28 is in contact with the ground terminal G and terminal contact 29, thus current will flow from the battery through the switch to the pilot lamp 35 at the center to indicate a reduction of speed. Upon continuation of the forward motion of the vehicle and just prior to making a right turn the lever 18 is raised still further to cause the shaft 20 to continue its rotation until the arm 28 contacts the terminal contact 30 at which time the pilot lamp and right turn light will be engaged.

Upon completion of the turn and the steering wheel is turned to straighten out the course of the vehicle the lug 25 will engage the inner end of the key 26 causing the shaft 20 to move forward away from the driver and re-engaging the inner end of the lever 18 with the keeper 42 as shown in Fig. 1 at this position the device is reset and again ready for operation.

As stated the operation for a left turn would be identical except that the left hand lever 18 would be operated as previously described, thus the signal is manually operated to indicate the direction of travel and is reset through the turning of the steering wheel to straighten out the course of the vehicle.

What is claimed is:

A switch mechanism for a signaling device for a vehicle having a housing that is adapted to be mounted in close proximity to the steering wheel of the vehicle, the improvement comprising a rotatable shaft mounted in said housing, a key member fixed to the upper end of the shaft, a contact arm carried by the lower end of the shaft and adapted to engage fixed contacts carried by said housing interiorly thereof, a manually operated lever pivotally mounted in said housing at an angle to said shaft, a spring carried by said lever for the tensioning thereof, a keeper on the shaft below the key within the housing and adapted to be engaged by the inner end of the lever to retain the arm out of contact with the fixed contacts, a spring on said shaft for the tensioning thereof whereby when the end of said lever is disengaged from said keeper, said spring will cause said shaft to rotate to cause selective engagement of said control contact arm with said fixed contact and means carried by said steering wheel for engaging said key to move said key to cause said shaft to return said arm out of contact with said fixed contacts.

HARLOW G. FRANK.

REFERENCES CITED

The following references are of record in the file of this patent:

UNITED STATES PATENTS

| Number | Name | Date |
| --- | --- | --- |
| 1,365,127 | Swartwout | Jan. 11, 1921 |
| 1,453,226 | Harvey | Apr. 24, 1923 |
| 1,528,116 | Laycock | Mar. 3, 1925 |
| 1,608,751 | Johns | Nov. 30, 1926 |
| 1,690,370 | Hoeller | Nov. 6, 1928 |
| 2,064,735 | Curtiss | Dec. 15, 1936 |